United States Patent [19]
Amano et al.

[11] Patent Number: 4,909,071
[45] Date of Patent: Mar. 20, 1990

[54] SPARK PLUG PRESSURE SENSOR

[75] Inventors: Kouzou Amano; Yoshiaki Saiki; Shuzo Matsumura, all of Nagoya, Japan

[73] Assignee: NGK Spark Plug Co., Ltd., Nagoya, Japan

[21] Appl. No.: 313,745

[22] Filed: Feb. 22, 1989

[30] Foreign Application Priority Data

Mar. 7, 1988 [JP] Japan .............................. 63-29095[U]

[51] Int. Cl.$^4$ ........................................... G01M 15/00
[52] U.S. Cl. ........................................ 73/115; 73/754
[58] Field of Search ................... 73/115, DIG. 4, 714, 73/754, 35; 310/338

[56] References Cited

U.S. PATENT DOCUMENTS 4,686,861  8/1987  Morii ............................... 73/115 X

FOREIGN PATENT DOCUMENTS 201231  10/1985  Japan ...................................... 73/35

Primary Examiner—Jerry W. Myracle
Attorney, Agent, or Firm—Cooper & Dunham

[57] ABSTRACT

A spark plug with pressure sensor comprising; a center electrode; an insulator placed to enclose the center electrode to support the electrode; a metallic shell having a diameter-increased portion, a diameter-reduced portion and a male thread portion in turn, the male thread portion being diametrically smaller than the diameter-reduced portion; an annular-shaped pressure sensor inserted into an outer surface of the diameter-reduced portion; an annular flange inserted into the outer surface of the diameter-reduced portion to sandwich the pressure sensor with an overhang portion of the diameter-increased portion; a gasket ring being placed underside of the flange when the metallic shell is screwed through the thread portion to a cylinder block of an engine; the annular flange extending its inner rim to position at a central side of the pressure sensor, and welded to the metallic shell.

5 Claims, 3 Drawing Sheets

SPARK PLUG PRESSURE SENSOR

BACKGROUND OF THE INVENTION

1. Field of the Invention

This invention relates to a spark plug equipped with a pressure sensor to detect pressure appearing in a combustion chamber at the time of running an engine so as to transmit it to a microcomputer in a form of electrical signal.

2. Description of the Prior Art

This kind of spark plug has been introduced to detect pressure in a combustion chamber. This pressure is transformed into electrical signal by a pressure sensor which allows to contol timing of ignition and fuel injection with a microcomputer as an assistant to obtain an optimum output and fuel consumption.

The sensor is usually in the form of annular-shape, and inserted into a diameter-reduced portion provided between a diameter-increased portion and a male thread portion of a metallic shell in a spark plug.

An annular flange is of angle-shape in section, and inserted into the diameter-reduced portion.

The flange having a vertical inner rim and a horizontal outer rim, the inner rim is welded to the metallic shell while the inner rim supports the pressure sensor. A gasket ring is inserted into the diameter-reduced portion when the metallic shell is screwed through the thread portion to a cylinder block of an engine. The gasket ring has outer and inner diameter generally equivalent to those of the pressure sensor. The inner rim of the gasket ring is liable to interfere with the welded portion of the flange.

In this instance, tight engagement between the gasket ring and the horizontal rim of the flange, is somewhat lost to hinder the pressure of the cylinder block from sufficiently transmitting to the pressure sensor, thus reducing an output of the sensor to significant degree.

Therefore, it is an object of this invention to provide a spark plug with pressure sensor which is capable of preventing a gasket ring from interfering with a welded portion of a flange without enlarging an inner diametrical dimention of the gasket ring, thus improving an output of a sensor to maintain a precise and exact pressure detecting function for a long period of time with a relatively simple construction.

Accordingly there is provided a spark plug with pressure sensor comprising; a center electrode having a high voltage terminal; and insulator placed to enclose said center electrode to securely support the electrode; a tubular metallic shell having a diameter-increased portion, a diameter-reduced portion and a male thread portion in axially continuous relationship, said male thread portion being diametrically smaller than said diameter-reduced portion; an annular-shaped pressure sensor inserted into an outer surface of said diameter-reduced portion; an annular flange inserted into the outer surface of said diameter-reduced portion to sandwich said pressure sensor in thickness direction with an overhang portion of said diameter-increased portion; a gasket ring having outer and inner diameter substantially equivalent to those of said pressure sensor, the gasket ring being placed underside of said flange when said metallic shell is screwed through said thread portion to a stationary member such as a cylinder block of an engine; said annular flange extending its inner rim toward a center along the diametrical direction to position at a central side of an inner rim of said pressure sensor, and said inner rim being secured to said metallic shell by means of thermal fusion.

DETAILED DESCRIPTION OF THE INVENTION

Figure 1:
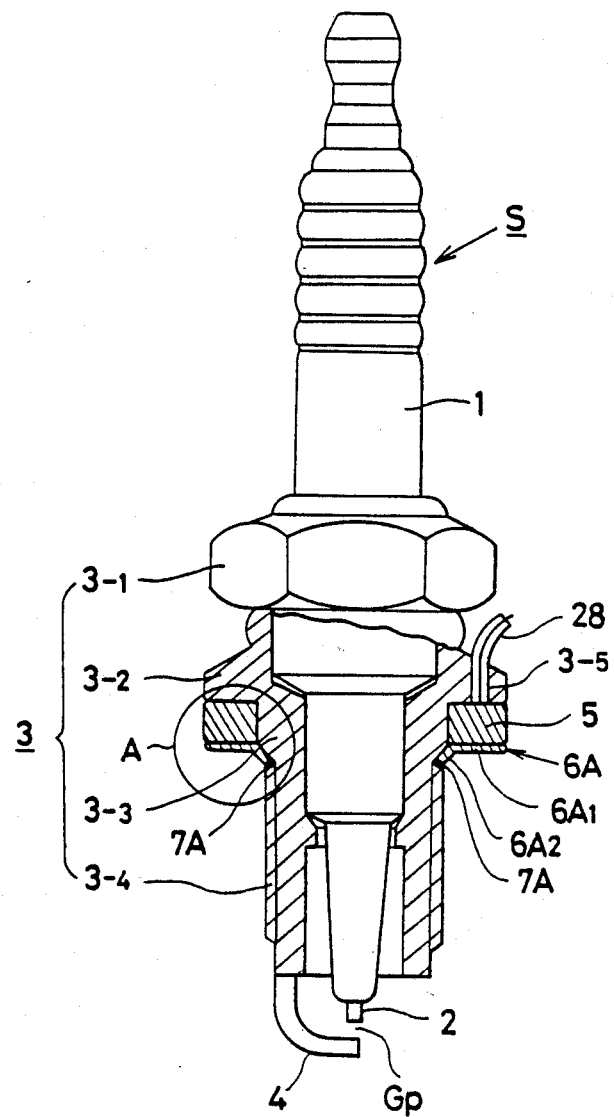
FIG. 1 is a plan view of spark plug with pressure sensor but partly sectioned.
Figure 2A:
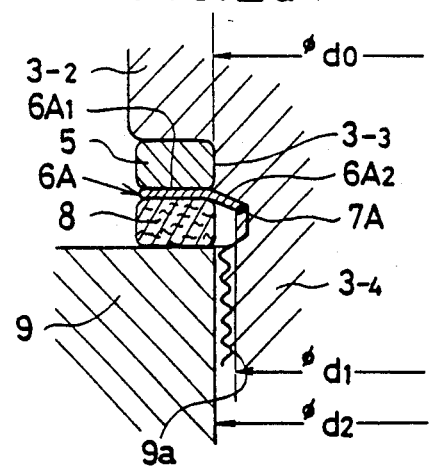
FIG. 2 (a) and (b) are enlarged sectional views of a main part marked by circle A in FIG. 1.
Figure 2B:
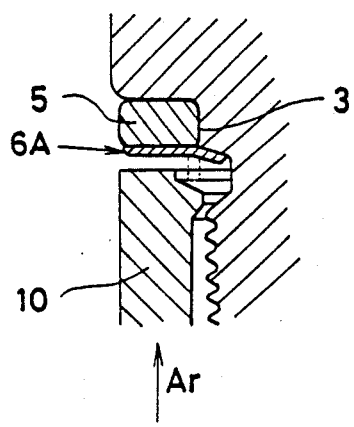

In reference with FIG. 1 and FIG. 2 (a) and (b) of the drawings a ceramic insulator 1 has a center electrode 2 in its inner hollow space (not shown).

The center electrode 2 has a high voltage terminal at its one end, and the insulator 1 is inserted into a metallic shell 3 which provides a hexagonal head portion 3-1 applied when securing to a cylinder block of an internal combustion engine (not shown) by means of a tool such as, for example, a wrench.

The metallic shell 3 further has a diameter-increased portion 3-2, a diameter-reduced portion 3-3, and a threaded portion 3-4 which is to be screwed to a threaded hole 9a formed at a cylinder head 9 at the time of mounting a spark plug (S).

At the diameter-increased portion 3-2 is a longitudinal throughhole 3-5 provided, through which a lead wire 28 is introduced outside.

At a front end of the threaded portion 3-4, a L-shaped outer electrode 4 is extended to form a spark gap (Gp) between the electrodes 4 and 2.

A pressure sensor 5 has a metallic casing (not shown) in a form of hollow ring rectangular in section.

The casing of the sensor 5 is inserted into the diameter-reduced portion 3-3 with an inner side of the casing air-tightly engaging an outer side of the portion 3-3. Into the casing, is an annular piezoelectrical element (not shown) air-tightly enclosed.

An annular metallic flange 6A has an outer diameter equivalent to that of the sensor 5, and having an outer horizontal rim $6A_1$ and an inner slantwise rim $6A_2$. The slantwise rim $6A_2$ has an inner diameter ($d_1$) smaller than that of the sensor 5. The flange 6A is inserted into the diameter-reduced portion 3-3. In this situation, the horizontal rim $6A_1$ air-tightly supports the sensor 5 in a manner of sandwiching the sensor 5 in the thickness direction with an overhanging portion of the diameter-increased portion 3-2. The slantwise rim $6A_2$ extends at its innermost edge toward a boundary between the diameter-reduced portion 3-3 and the threaded portion 3-4, and secured to the metallic shell 3 by means of such as laser beam welding, for example, as designated by 7A.

In this instance, it stands as a matter of course that electron beam or seam welding may be employed, instead of the laser beam welding.

The structure is such that the welded portion 7A positions away from an inner rim of the sensor 5 to near to a center of the sensor 5.

At the time of placing a gasket ring 8, the flange 6A is performed in the shape of angle in section as seen at dotted lines in FIG. 2 (b). Then, the dotted vertical rim is forcibly pushed upward (indicated by arrow Ar) to deform into the slantwise rim $6A_2$ of FIG. 2 (a) by means of a cylindrical tool 10.

A gasket ring 8 has outer and inner diameter generally equivalent to those of the sensor 5. The gasket ring 8 is inserted through the threaded portion 3-4 to engage with underside of the horizontal rim $6A_1$, when the shell 3 is screwed to the threaded hole 9a of the cylinder head 9 at the time of mounting the spark plug (S).

Now, take a spark plug of M14 type as one example, the diameter-reduced portion 3-3 has an outer diametrical dimention ($d_0$) ranging from 12.0mm to 13.5mm.

Under this condition, it is found that the gasket ring 8 is allowed to lessen its inner diameter ($d_2$) as small as 14.5mm.

In the meantime, the lead wire 28 is connected at one end to the inner electrode (not shown) and connected at other end to a microcomputer which controls timing of ignition and fuel injection for optimum output and fuel consumption.

As understood from the foregoing description, the flange extends its inner rim to position the welded portion 7A at an innerside of that of the sensor 5, thus preventing the gasket ring 8 from interfering with the welded portion 7A without enlarging an inner diameter of the gasket ring 8.

This enables gasket ring to retain its minimum inner diameter, avoiding the gasket ring from being out of concentrical relationship with the sensor so as to secure a stabilized output therefrom.

On the other hand, engagement area between the gasket ring and the sensor, becomes increased so that a sufficiently greater output from the sensor is favorably obtained with a simple construction.

Figure 3A:
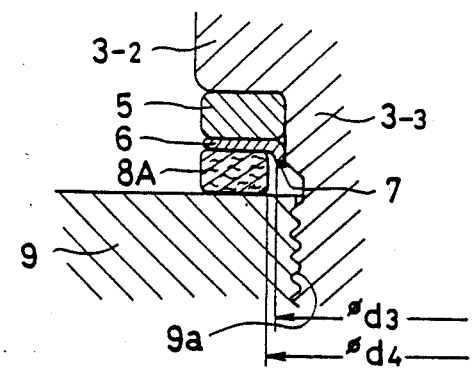
FIG. 3 (a) and (b) are views similar to FIG. 2 (a) and (b) for the sake of comparing some modified examples conceivable.
Figure 3B:
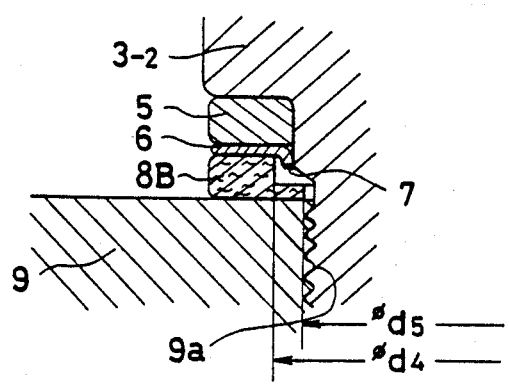

Incidentally, in order to avoid an interference with welded portion, it can be conceived to modify a gasket ring 8A, (8B) as seen in FIG. 3 (a), (b) with a flange 6 retained as angle-shape in section.

In FIG. 3 (a), the gasket ring 8A is enlarged at its inner diameter ($d_4$) to be greater than an inner diameter ($d_3$) which is defined by a welded portion 7 of the flange 6.

The gasket ring 8A, however, is liable to deviate from concentrical relationship with the sensor 5 at the time of mounting the gasket ring 8A. The sensor 5 is subjected to unfavorable variation at its output. In addition, an engagement area between the sensor 5 and the gasket ring 8A, decreases to result in an output of insufficient level.

In FIG. 3 (b), the gasket ring 8B is formed into stepwise at its inner rim region. An upper step of the gasket ring 8B has an inner diameter ($d_4$) equivalent to that of the gasket ring 8A, while a lower step of the gasket ring 8B has an inner diameter ($d_5$) equivalent to that of the sensor 5.

In this case, the gasket ring 8B is placed in concentrical relationship with the sensor 5. An engagement area between the sensor 5 and the gasket ring 8B, however, tends to decrease to result in an insufficient output as generally the same in the case of above the gasket ring 8A.

Now, it in noted that the flange is welded to the metallic shell, instead of welding, thermal fusion such as brazing and soldering may be used.

Various modifications of the above described embodiments of this invention will be apparent to those skilled in the art, and it is to be understood that such modifications can be made without departing from the scope of the invention, if within the spirit and tenor of the accompanying claims.

What is claimed is:

1. A spark plug with pressure sensor comprising; a center electrode having a high voltage terminal; an insulator placed to enclose said center electrode to securely support the electrode; a tubular metallic shell having a diameter-increased portion, a diameter-reduced portion and a male thread portion in axially continuous relationship, said male thread portion being diametrically smaller than said diameter-reduced portion; and annular-shaped pressure sensor inserted into an outer surface of said diameter-reduced portion; an annular flange inserted into the outer surface of said diameter-reduced portion to sandwich said pressure sensor in thickness direction with an overhang portion of said diameter-increased portion; a gasket ring having outer and inner diameter substantially equivalent to those of said pressure sensor, the gasket ring being placed underside of said flange when said metallic shell is screwed through said thread portion to a stationary member such as a cylinder block of an engine; said annular flange extending its inner rim toward a center along the diametrical direction to position at a central side of an inner rim of said pressure sensor, and said inner rim being secured to said metallic shell by means of thermal fusion.

2. In a spark plug with pressure sensor as recited in claim 1, said flange is preformed into angle-shape in section, and an inner rim of said flange is generally flattened at the time of said thermal fusion.

3. In a spark plug with pressure sensor as recited in claim 1, said thermal fusion is by means of laser beam welding.

4. In a spark plug with pressure sensor as recited in claim 1, said thermal fusion is by means of brazing or soldering.

5. In a spark plug with pressure sensor as recited in claim 1, said pressure sensor comprising a piezoelectric element air-tightly enclosed into hollow metallic casing rectangular in section.

* * * * *